United States Patent
Imazeki et al.

(10) Patent No.: US 7,220,999 B2
(45) Date of Patent: May 22, 2007

(54) ELECTRO-OPTICAL DEVICE, ELECTRONIC INSTRUMENT HAVING THE SAME, AND MANUFACTURING METHOD OF THE SAME

(75) Inventors: Yoshikatsu Imazeki, Hyogo (JP); Kazuyoshi Sakai, Misato-mura (JP)

(73) Assignee: Seiko Epson Corporation (JP)

( * ) Notice: Subject to any disclaimer, the term of this patent is extended or adjusted under 35 U.S.C. 154(b) by 76 days.

(21) Appl. No.: 10/816,227

(22) Filed: Apr. 1, 2004

(65) Prior Publication Data

US 2004/0245533 A1    Dec. 9, 2004

(30) Foreign Application Priority Data

Apr. 1, 2003   (JP) ............................ 2003-098252
Jan. 26, 2004  (JP) ............................ 2004-017260

(51) Int. Cl.
      *H01L 29/207*    (2006.01)
(52) U.S. Cl. ............................ 257/93; 438/30; 438/27; 438/65; 438/29; 257/100; 349/151; 349/147; 349/157
(58) Field of Classification Search ................ 257/686, 257/93, 778, 57, E33.059, 100; 361/735; 349/151, 147, 157; 438/16, 27, 65, 30, 29
See application file for complete search history.

(56) References Cited

U.S. PATENT DOCUMENTS

| | | | |
|---|---|---|---|
| 5,381,255 A * | 1/1995 | Ohnuma et al. | 349/106 |
| 6,466,294 B1 * | 10/2002 | Yamagishi et al. | 349/155 |
| 6,927,818 B2 * | 8/2005 | Hinata et al. | 349/114 |
| 2002/0005928 A1 * | 1/2002 | Hanakawa et al. | 349/149 |

FOREIGN PATENT DOCUMENTS

| | | |
|---|---|---|
| JP | 07-045226 | 2/1995 |
| JP | 2002-214627 | 2/1995 |
| JP | 08-179332 | 7/1996 |
| JP | 10-111515 | 4/1998 |
| JP | 2000-199915 | 7/2000 |
| JP | 2000-347173 | 12/2000 |
| JP | 2001-175198 | 6/2001 |
| JP | 2001-281691 | 10/2001 |
| JP | 2002-214627 | 7/2002 |

* cited by examiner

*Primary Examiner*—M. Wilczewski
*Assistant Examiner*—Tsz Kit Chiu
(74) *Attorney, Agent, or Firm*—Harness, Dickey & Pierce, P.L.C.

(57) ABSTRACT

An electro-optical device is provided that includes a protection layer formed on a first substrate leaving a region of the first substrate region exposed; a first electrode formed on the protection layer; a first inter-substrate conduction unit formed on the protection layer and electrically connected to the first electrode; a second substrate opposing the first substrate and having a second electrode formed thereon; a second inter-substrate conduction unit formed on the second substrate and electrically connected to the second electrode; and a conductive member interposed between the first inter-substrate conduction unit and the second inter-substrate conduction unit to electrically connect both units together. The electro-optical device further includes a sealant that contains the conductive member bonding the first substrate and the second substrate together by extending over the protection layer and the exposed region where the protection layer is not formed.

14 Claims, 7 Drawing Sheets

ELECTRO-OPTICAL DEVICE, ELECTRONIC INSTRUMENT HAVING THE SAME, AND MANUFACTURING METHOD OF THE SAME

RELATED APPLICATIONS

This application claims priority to Japanese Patent Application Nos. 2003-098252 filed Apr. 1, 2003 and 2004-017260 filed Jan. 26, 2004 which are hereby expressly incorporated by reference herein in their entireties.

BACKGROUND

1. Field of Invention

The present invention relates to an electro-optical device, and in detail relates to an electro-optical device capable of improving the adhesion strength of a substrate corresponding to the miniaturization of a drive electrode, an electronic instrument having the electro-optical device, and a manufacturing method of the electro-optical device.

2. Description of Related Art

An electro-optical device such as a liquid crystal panel includes a drive electrode corresponding to each pixel, data wiring for supplying an image signal and a scanning signal to the drive electrode, a color filter substrate having a color filter formed in a pixel region, and a opposing substrate having an opposing electrode and disposed to oppose the color filter substrate. A glass substrate is used in the color filter substrate and the opposing substrate. Both the substrates are bonded together by applying a sealant to a sealing region located in the periphery of an image display region so as to clamp an electro-optical substance such as liquid crystal between both the substrates.

Furthermore, a pixel electrode and the opposing electrode respectively formed in both the substrates are electrically connected together by interposing a micro spherical conductive member between upper and lower conduction regions respectively provided in both the substrates. When the electro-optical device is operated, a drive voltage is generated between the pixel electrode and the opposing electrode for each pixel corresponding to the pixel electrode so as to change the orientation of the liquid crystal, which is the electro-optical substance.

In the color filter substrate, a drive electrode is formed on the color filter using an ITO (indium tin oxides) film. Since the color filter has a weakness for heat, for protecting the color filter, the drive electrode is provided after a protection layer made of an organic insulating film is formed on the color filter. Since the conductive member is arranged in the upper and lower conduction regions respectively provided in the color filter substrate and the opposing substrate, if the upper and lower conduction regions are formed on the protection layer, a small conductive member can be used so as to have a preferable structure for miniaturizing the drive electrode. Since the sealant is applied to the upper and lower conduction regions including the conductive member, the color filter substrate and the opposing substrate are bonded together interposing the protection layer therebetween.

However, the adhesion strength between the protection layer and the drive electrode ($SiO_2$+ITO electrode) on the protection layer may not be so large, so that the color filter substrate may peel off the opposing substrate. Since the adhesion strength of a terminal unit on the protection layer cannot also be large, an FPC (flexible printed circuit) and external wiring are necessary to be mounted on the opposing substrate, reducing the degree of mounting freedom on an electronic instrument.

SUMMARY

The present invention has been made in view of the above description and it is an object thereof to provide an electro-optical device capable of improving the adhesion strength of a substrate and achieving the miniaturization of a conduction unit between substrates, an electronic instrument having the electro-optical device, and a manufacturing method of the electro-optical device.

In order to achieve the object mentioned above, an electro-optical device according to the present invention includes a first substrate; a protection layer formed on the first substrate leaving part of the first substrate region exposed; a first electrode formed on the protection layer; a first inter-substrate conduction unit formed on the protection layer and electrically connected to the first electrode; a second substrate arranged to oppose the first substrate and having a second electrode formed thereon; a second inter-substrate conduction unit formed on the second substrate and electrically connected to the second electrode; a conductive member interposed between the first inter-substrate conduction unit and the second inter-substrate conduction unit to electrically connect both the units together; and a sealant that contains the conductive member as well as bonding the first substrate and the second substrate together by applying the sealant so as to extend over the region where the protection layer is formed and the region where the protection layer is not formed.

In the electro-optical device, when the first substrate is electrically connected to the second substrate opposing the first substrate, the first inter-substrate conduction unit is formed on the protection layer formed leaving part of the first substrate region intact (e.g., exposed). Then, by interposing a conductive member between the first inter-substrate conduction unit and the second inter-substrate conduction unit disposed on the second substrate, the first and second substrates are sealed together by applying the sealant so as to extend over the region where the protection layer is formed and the region where the protection layer is not formed and to embrace the conductive member. By such a configuration, since the sealant is bonded on the first substrate without interposing the protection layer, the failure of the first substrate due to the delamination of the protection layer can be reduced. Consequently, the resistance of the electro-optical device against damage due to dropping and vibration is improved, leading to the excellent reliability. The first substrate is conducted to the second substrate on the protection layer, so that the pitch between the inter-substrate conduction units can be reduced, facilitating the increase of the density of pixels.

In an electro-optical device according to another invention, the protection layer is formed on the first substrate leaving a predetermined region exposed, which extends inside from the external periphery of the first substrate. By such a configuration, the inter-substrate conduction units are arranged on predetermined regions of the first and second substrates inside from the external peripheries, so that sizes of the first and second substrates can be reduced. Thereby, the electro-optical device can be miniaturized.

In an electro-optical device according to another invention, the shape of the protection layer disposed in the bottom of the first inter-substrate conduction unit is coordinated with that of the first inter-substrate conduction unit. In such a configuration, the protection layer does not exist between the first inter-substrate conduction units, so that the adhesion area of the sealant to the first substrate is increased in comparison with the electro-optical device described above.

By increasing the area of the sealant, the adhesion strength between the sealant and the first substrate is increased, so that the resistance against delamination can be increased in comparison with the electro-optical device described above.

In an electro-optical device according to another invention, the protection layer disposed on the first substrate is provided with a color filter formed in its lower layer in an electro-optical panel while the size of the first substrate is larger than that of the second substrate, so that the extended region of the first substrate produced when both the substrates are bonded together is provided with a mounting terminal formed to be connected to the first inter-substrate conduction unit.

In this electro-optical device, the first substrate having the color filter formed thereon is larger in size than the second substrate to be a display surface. Since the protection layer on the first substrate is formed on a region smaller in area than the second substrate, the extended region of the first substrate produced when the first and second substrates are bonded together is not provided with the protection layer. Thereby, by forming a mounting terminal without interposing the protection layer, the FPC and other components can be mounted thereon, so that the resistance against the delamination of the mounting terminal can be improved, leading to the excellent reliability of the electro-optical device.

An electro-optical device according to another aspect of the present invention includes a first substrate; a protection layer formed on the first substrate leaving part of the first substrate region exposed; a first electrode formed on the protection layer on the first substrate; a first inter-substrate conduction unit formed on the protection layer and electrically connected to the first electrode; a second substrate arranged to oppose the first substrate and having a second electrode formed thereon; a second inter-substrate conduction unit formed on the second substrate and electrically connected to the second electrode; a first wiring pattern formed on the first substrate and electrically connected to the first inter-substrate conduction unit; a metallic wiring pattern formed in the lower layer of the protection layer and electrically connected to the first wiring pattern; a conductive member interposed between the first inter-substrate conduction unit and the second inter-substrate conduction unit, to electrically connect both the units together; and a sealant that contains the conductive member as well as bonding the first substrate and the second substrate together by applying the sealant so as to extend over the region where the protection layer is formed and the region where the protection layer is not formed.

The electrode made of the ITO film is connected to the mounting terminal by being routed on the first substrate for connecting to a driver circuit. At this time, there is wiring to be routed to the mounting terminal at a long distance, so that if the wiring is made of only the ITO film, the electrical resistance is extremely increased. According to the present invention, since the first wiring pattern and the metallic wiring pattern electrically connected to the first inter-substrate conduction unit are electrically connected together, the electrical resistance of the above-mentioned wiring can be reduced.

Since the sealant to be applied extends over the region where the protection layer is formed and the region where the protection layer is not formed and to embrace the conductive member, the first and second substrates are bonded together. By such a configuration, since the sealant and the first substrate are bonded together without interposing the protection layer, the failure of the first substrate due to the delamination of the protection layer can be reduced. As a result, the resistance of the electro-optical device against damage due to dropping and vibration is improved, leading to the excellent reliability. Also, the first substrate is conducted to the second substrate on the protection layer, so that the pitch between inter-substrate conduction units can be reduced, facilitating the increase in the density of pixels.

Also, an electro-optical device according to another aspect of the invention includes a first substrate; a protection layer formed on the first substrate leaving part of the first substrate region exposed; a first electrode formed on the protection layer; a first inter-substrate conduction unit formed on the protection layer and electrically connected to the first electrode; a second substrate arranged to oppose the first substrate and having a second electrode formed thereon; a second inter-substrate conduction unit formed on the second substrate and electrically connected to the second electrode; and a conductive member interposed between the first inter-substrate conduction unit and the second inter-substrate conduction unit, to electrically connect both the units together. The electro-optical device further includes a sealant having a region that contains the conductive member and a region with a thickness larger than that of the region for embracing the conductive member so as to bond the first substrate and the second substrate together.

In an electro-optical device according to another invention, the material of the first wiring pattern is the same as that of the first inter-substrate conduction unit and further, the resistance of the metallic wiring pattern is smaller than that of the first wiring pattern. In such a manner, the first wiring pattern and the first inter-substrate conduction unit can be formed in the same process, so that the manufacturing processes of the electro-optical device can be reduced.

In an electro-optical device according to another invention, the metallic wiring pattern is made of any one of silver, a silver alloy, aluminum, and an aluminum alloy. Such a material can reduce the electrical resistance and also can be used as a reflection film in a reflective electro-optical device.

Therefore, in the reflective electro-optical device, since the metallic wiring pattern and the reflection film can be manufactured in the same process, the manufacturing processes of the electro-optical device can be reduced.

In an electro-optical device according to another invention, the protection layer is formed on the first substrate leaving a predetermined region exposed, which extends inside from the external periphery of the first substrate. By this configuration, the inter-substrate conduction units are arranged on predetermined regions of the first and second substrates inside from the external peripheries, so that sizes of the first and second substrates can be reduced. Thereby, the electro-optical device can be miniaturized.

In an electro-optical device according to another invention, the shape of the protection layer disposed in the bottom of the first inter-substrate conduction unit is coordinated with that of the first inter-substrate conduction unit. By such a configuration, the protection layer does not exist between the first inter-substrate conduction units, so that the adhesion area of the sealant to the first substrate is increased in comparison with the electro-optical device described above. Thereby, the adhesion strength between the sealant and the first substrate is increased, so that the resistance against delamination can be increased in comparison with the electro-optical device described above.

An electronic instrument according to another aspect of the invention includes the electro-optical device described above. Since the adhesive strength is large between substrates and in the mounting terminal of the electro-optical device, this electronic instrument has a high resistance against damage due to dropping and vibration. Also, in the electro-optical device, the pitch of inter-substrate conduction units is small, so that the electronic instrument can display images with high resolution corresponding to the progress toward the higher pixel density.

A manufacturing method of an electro-optical device according to another aspect of the invention includes the steps of forming a first inter-substrate conduction unit after forming a protection layer on a first substrate leaving part of the first substrate region exposed while forming a second inter-substrate conduction unit on a second substrate; arranging a conductive member between the first inter-substrate conduction unit and the second inter-substrate conduction unit for electrically connecting both the units together; and applying a sealant so as to embrace the conductive member and to extend over the region where the protection layer is formed and the region where the protection layer is not formed for bonding the first substrate and the second substrate together.

According to the manufacturing method of the electro-optical device, after the protection layer is formed on the first substrate leaving part of the first substrate region exposed, the first inter-substrate conduction unit is formed, and further the sealant is applied so as to extend over the region where the protection layer is formed and the region where the protection layer is not formed for bonding the first substrate and the second substrate together. Thereby, the electro-optical device can be manufactured in that the adhesion strength of the substrate is large and the pitch between inter-substrate conduction units is fine.

A manufacturing method of an electro-optical device according to another aspect of the invention includes the steps forming a metallic wiring pattern on a first substrate; forming a protection layer on the metallic wiring pattern leaving part of the first substrate region exposed; forming a first wiring pattern on the protection layer as well as on the metallic wiring pattern so as to connect both the patterns together while forming a first inter-substrate conduction unit on the protection layer so as to be electrically connected to the first wiring pattern; and applying a sealant so as to extend over the region where the protection layer is formed and the region where the protection layer is not formed and to embrace a conductive member, which is disposed between the first inter-substrate conduction unit and a second inter-substrate conduction unit disposed on a second substrate arranged to oppose the first substrate for electrically connecting both the units together, for bonding the first substrate and the second substrate together.

According to the manufacturing method of the electro-optical device, after the protection layer is formed on the metallic wiring pattern leaving part of the first substrate region exposed, the first inter-substrate conduction unit is formed. Then, the first wiring pattern is formed on the protection layer so as to be connected to the metallic wiring pattern while the sealant is applied so as to extend over the region where the protection layer is formed and the region where the protection layer is not formed for bonding the first substrate and the second substrate together. Thereby, the electro-optical device can be manufactured in that the adhesion strength of the substrate is large and the pitch between inter-substrate conduction units is fine while the reduction is achieved in the resistance of wiring connecting the drive electrode to the mounting terminal.

DETAILED DESCRIPTION

Figure 1A:
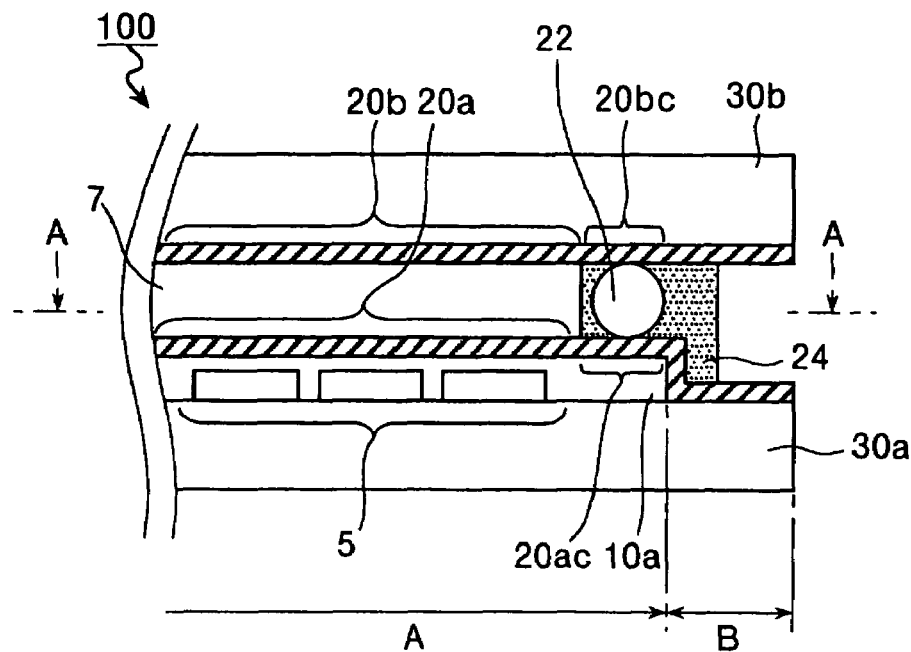
FIGS. 1 A–B are explanation drawings showing a structure of an electro-optical device according to a first embodiment.

The present invention will be described below in detail with reference to the drawings. The invention is not limited to these embodiments. Also, the components of the embodiments include ones readily assumable by those skilled in the art or substantially identical ones. In the embodiments below, a liquid crystal display will be exemplified; however, an electro-optical device according to the present invention is not limited to this display. Also, in the embodiments below, a color electro-optical device will be exemplified; however, the present invention is not limited to application in this color electro-optical device.

First Embodiment

FIG. 1 is an explanation drawing for showing the structure of an electro-optical device according to a first embodiment. An electro-optical device 100 is characterized in that a conductive member 22 is arranged on a first inter-substrate conduction unit 20*ac* formed on a protection layer 10*a*; and a sealant 24 is applied so as to extend over the region A where the protection layer 10*a* is formed and the region B where the protection layer 10*a* is not formed for bonding two first and second substrates 30*a* and 30*b* opposing each other together. By the conductive member 22 interposed between the first substrate 30*a* and the second substrate 30*b*, the first inter-substrate conduction unit 20*ac* and a second inter-substrate conduction unit 20*bc*, which are formed on the first substrate 30*a* and the second substrate 30*b*, respectively, are electrically connected together.

The electro-optical device 100 is a liquid crystal display panel in that between the first substrate 30*a* and the second substrate 30*b* disposed to oppose each other, liquid crystal is enclosed. The first substrate 30*a* and the second substrate 30*b* are transparent glass, and the first substrate 30*a* is provided with a color filter 5 formed on the surface. On the surface of the color filter 5, the protection layer 10*a* is formed for protecting the color filter 5 from the heat produced when a first drive electrode 20*a* is formed.

The protection layer 10*a* is formed on the first substrate 30*a* leaving a predetermined region exposed, which extends inside from the external periphery of the first substrate 30*a*. The protection layer 10*a* may use an organic insulator as its material, for example. On the protection layer 10*a*, the first drive electrode 20*a* is formed. On the other second substrate 30b, a second drive electrode 20b is formed. the first drive electrode 20a and the second drive electrode 20b are made of ITO films.

In the electro-optical device 100, an electric charge is applied between the first and second drive electrodes 20a and 20b, which are respectively formed on the first and second substrates 30a and 30b disposed to oppose each other, so as to form an electric field so that a pixel is turned on/off by changing the orientation of the liquid crystal on the color filter 5. Therefore, the first drive electrode 20a is necessary to be conducted to the second drive electrode 20b.

Figure 1B:
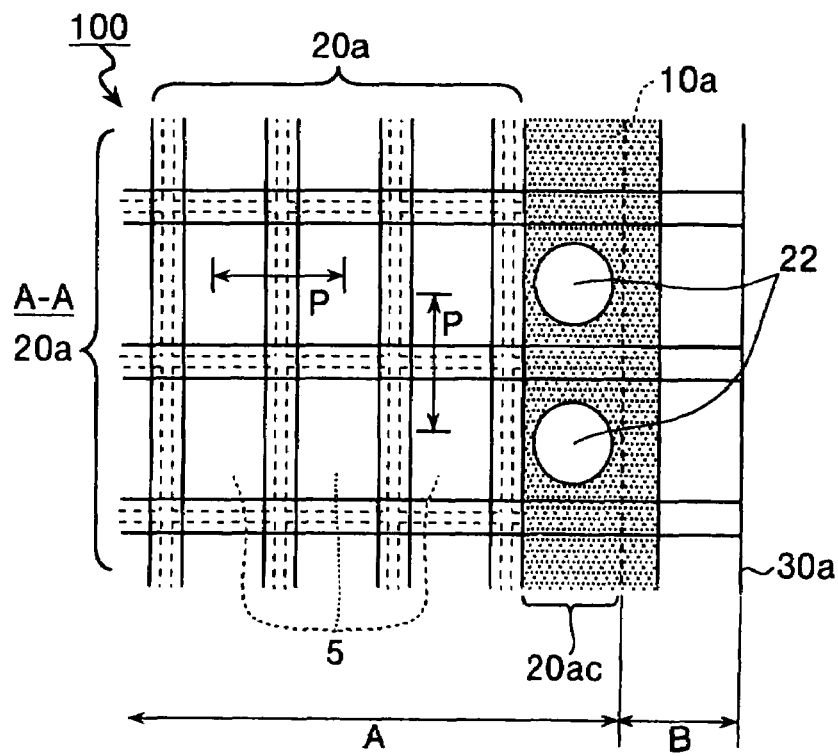

As shown in FIG. 1(a), by interposing the conductive member 22 between the first inter-substrate conduction unit 20ac and the second inter-substrate conduction unit 20bc respectively disposed on the two first and second substrates 30a and 30b, the first drive electrode 20a is conducted to the second drive electrode 20b. The conductive member 22 is a spherical resin material with the surface coated with a metal, which is a conductor, and may use Micropearl® from SEKISUI CHEMICAL CO., LTD., for example. Any of the first inter-substrate conduction unit 20ac and the second inter-substrate conduction unit 20bc is made of the ITO film, so that they are produced in the same process as that of the first drive electrode 20a.

As shown in FIGS. 1 (a), (b), in the electro-optical device 100, on the protection layer 10a, the first inter-substrate conduction unit 20ac of the first drive electrode 20a is formed. The first substrate 30a and the second substrate 30b are bonded together with the sealant 24. The sealant 24 embraces the conductive member 22 and is applied so as to extend over the region where the protection layer 10a is formed and the region where the protection layer 10a is not formed for bonding the first substrate 30a on the second substrate 30b. Thereby, while the first substrate 30a and the second substrate 30b are bonded together, the first drive electrode 20a is conducted to the second drive electrode 20b.

In the electro-optical device 100, the sealant 24 is applied so as to extend over the region A where the protection layer 10a is formed and the region B where the protection layer 10a is not formed. Thereby, in the region B where the protection layer 10a is not formed, the sealant is bonded to the first substrate 30a more firmly so that the sealant 24 can be bonded to the first substrate 30a more rigidly in comparison with the case where the sealant 24 is applied only on the protection layer 10a. Consequently, the first substrate 30a and the second substrate 30b are rigidly bonded together, improving the resistance against delamination. Since the conductive member 22 is arranged on the first inter-substrate conduction unit 20ac on the protection layer 10a, the conductive member 22 may use a member with a small diameter as of about a space between the substrates.

The pitch P of the first inter-substrate conduction units 20ac provided in the first drive electrode 20a can be thereby reduced, facilitating the progress toward high pixel density. Also, the conductive member 22 with a small diameter may be used, so that the short circuit of the first inter-substrate conduction unit 20ac can be prevented, improving the reliability of the connection between the first inter-substrate conduction unit 20ac and the second inter-substrate conduction unit 20bc.

Figure 2A:
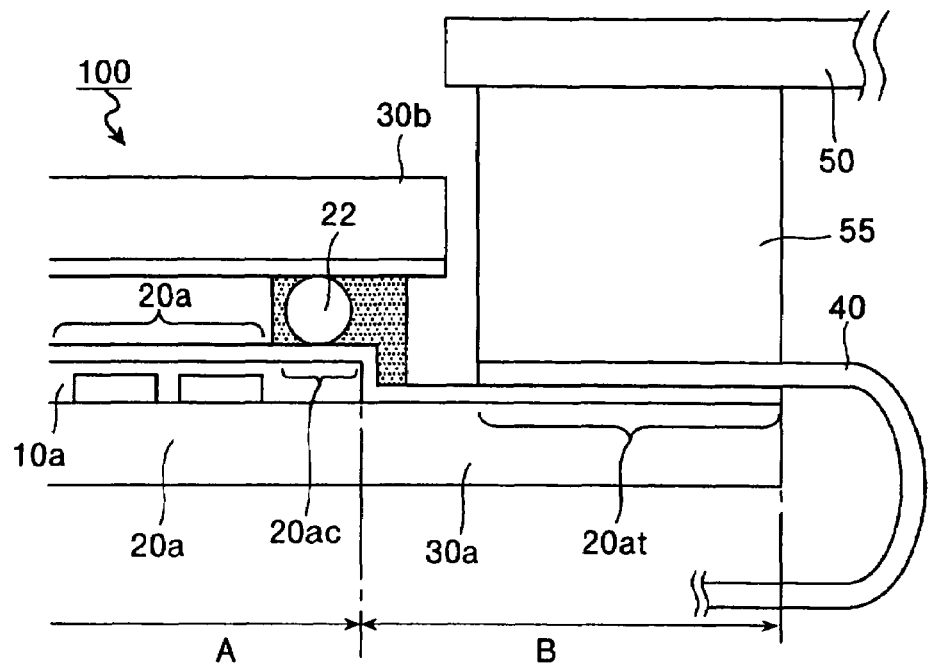
FIGS. 2 A–B are explanation drawings showing a state in that wiring is mounted on the electro-optical device according to the first embodiment.

FIG. 2 is an explanation drawing for illustrating a state in that wiring and the like are mounted on the electro-optical device according to the first embodiment. In the electro-optical device 100, an FPC (flexible printed circuit) 40 for supplying an image display signal is mounted on a mounting terminal 20at provided on the first substrate 30a, which is a color filter substrate. If the electro-optical device 100 is attached to an electronic instrument such as a mobile phone and a PDA (personal digital assistant), as shown in FIG. 2(a), the FPC 40 is wired to an image-processing unit adjacent to the electronic instrument by being bent opposite a display surface of the electro-optical device 100. By such a mounting method, when the electro-optical device 100 is attached to the electronic instrument, the FPC 40 can be pushed to the mounting terminal 20at with a pressure member 55 attached to a casing 50 of the electronic instrument, for example. Thereby, the FPC 40 is prevented from peeling off the mounting terminal 20at, so that it is preferable that the FPC 40 be mounted adjacent on the first substrate 30a, which is the color filter substrate.

On the other hand, in order to increase the density of the first drive electrodes 20a, the conductive member 22 is arranged in the first drive electrode 20a formed on the protection layer 10a so that the first drive electrode 20a and the second drive electrode 20b are conducted together. Since the adhesion strength between the protection layer 10a and the first substrate 30a is small in this configuration, the FPC 40 cannot be mounted adjacent on the first substrate 30a. Therefore, in this case, the FPC 40 is mounted adjacent on the second substrate 30b having the second drive electrode 20b formed thereon (FIG. 2(b)). According to the embodiment, the FPC 40 is liable to peel off the second drive electrode 20b. In such a manner, if the protection layer formed on the entire surface is adopted for increasing the density of the drive electrodes, there arises a problem in mounting the FPC 40.

In the electro-optical device 100 according to the present invention, the sealant 24 is applied so as to extend over the region A where the protection layer 10a is formed and the region B where the protection layer 10a is not formed. Then, the mounting terminal 20at is directly formed on the first substrate 30a. In such a manner, the mounting terminal 20at can be formed without interposing the protection layer 10a, improving the resistance against the delamination of the mounting terminal 20at. Consequently, even when a force is applied in a direction in that the FPC 40 peels off the mounting terminal 20at, the first substrate 30a is difficult to peel off the mounting terminal 20at. Also, since the conductive member 22 is arranged on the protection layer 10a, the pitches of the drive electrodes 20a and 20b (see FIG. 1(b)) can be reduced, facilitating the progress toward high pixel density. Therefore, in the electro-optical device 100 according to the present invention, in view of preventing delamination, the FPC 40 and the like can be preferably mounted while the densities of the drive electrodes can be simultaneously increased.

Figure 2B:
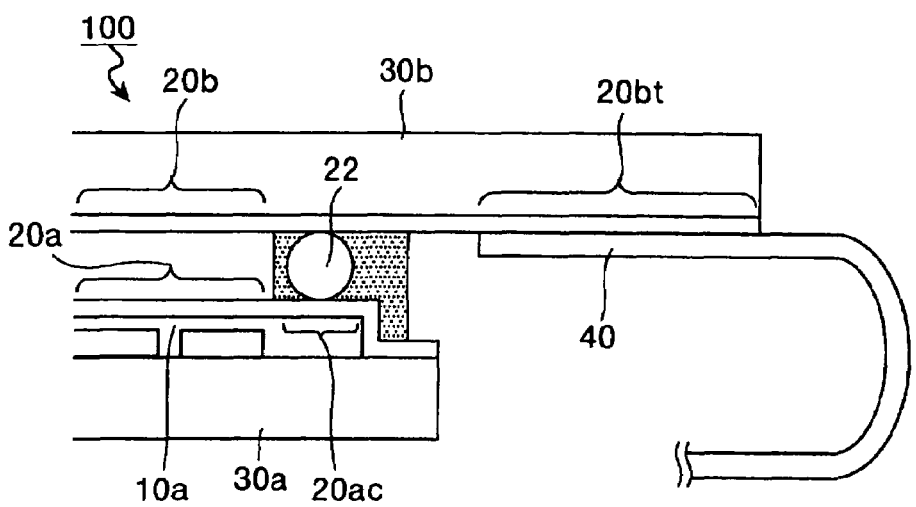

In addition, the electro-optical device 100 according to the present invention does not abate the mounting method shown in FIG. 2(b).

Second Embodiment

Figure 3A:
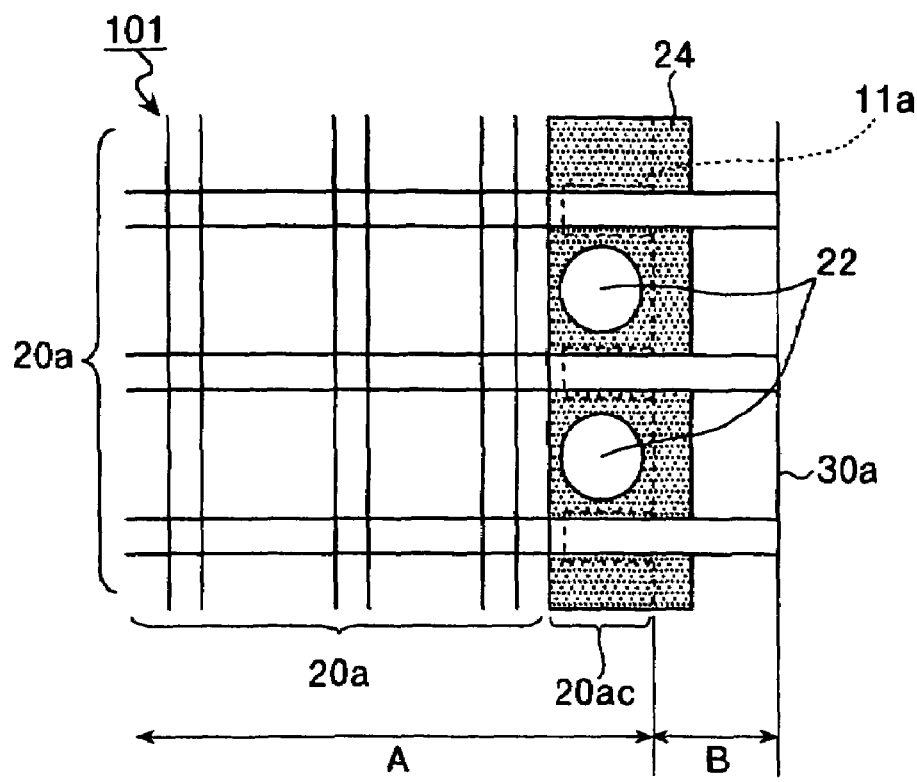
FIGS. 3 A–B are explanation drawings showing an electro-optical device according to a second embodiment.
Figure 3B:
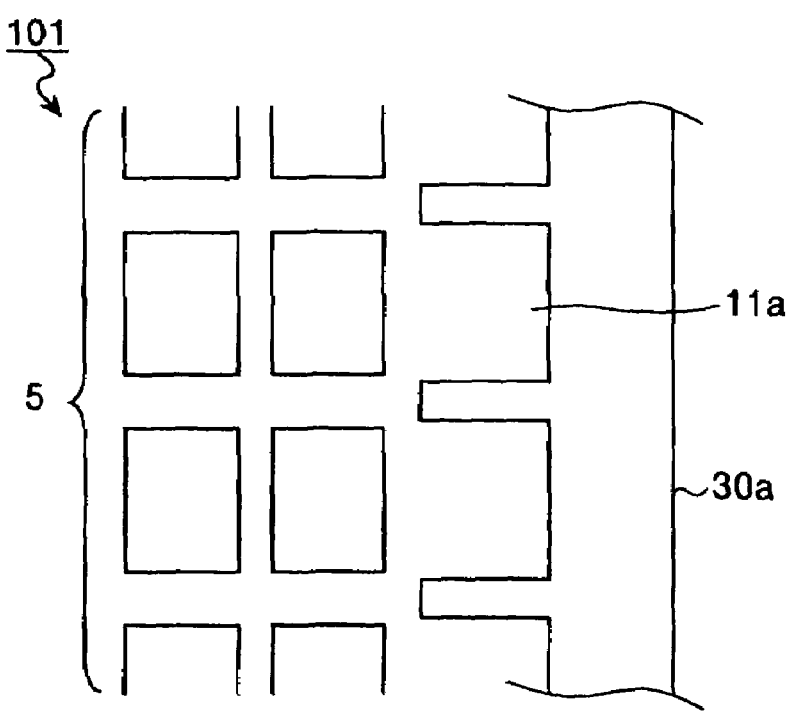

FIG. 3 is an explanation drawing showing an electro-optical device according to a second embodiment. An electro-optical device 101 according to the second embodiment is similar in structure to the electro-optical device 100 according to the first embodiment (see FIG. 1); and it is different in that the shape of a protection layer 11a is coordinated with that of the first inter-substrate conduction unit 20ac in the first drive electrode 20a. The other structures are the same as those of the electro-optical device 100 according to the first embodiment, so that like reference designates like components and the description is omitted.

As shown in FIG. 3(a), (b), the protection layer 11a on the first substrate 30a is formed in a shape coordinated with that of the first inter-substrate conduction unit 20ac. According to the embodiment, the protection layer 11a is not formed in a region where the first inter-substrate conduction unit 20ac is not formed, so that the protection layer 11a is formed in the shape of the teeth of a comb. In order to shape the protection layer 11a in such a manner, photolithography, liquid ejection by ink-jet, or screen printing may be used. Then, the first inter-substrate conduction unit 20ac in the first drive electrode 20a is formed on the protection layer 11a.

The sealant 24 is applied so as to extend over the region where the protection layer 11a is formed and the region where the protection layer 11a is not formed for bonding the first and second substrates 30a and 30b together. Since the electro-optical device 101 is basically the same in structure as the electro-optical device 100 according to the first embodiment of the present invention, operation and effect are achieved identically to the electro-optical device 100. Furthermore, in the electro-optical device 101, since the protection layer 11a does not exist between the first inter-substrate conduction units 20ac, the adhesion area between the sealant 24 and the first substrate 30a becomes large in comparison with the electro-optical device 100 according to the first embodiment. The increase in the area leads to the increased adhesion strength between the sealant 24 and the first substrate 30a that much, improving the resistance against delamination in comparison with the electro-optical device 100 according to the first embodiment.

Third Embodiment

Figure 4A:
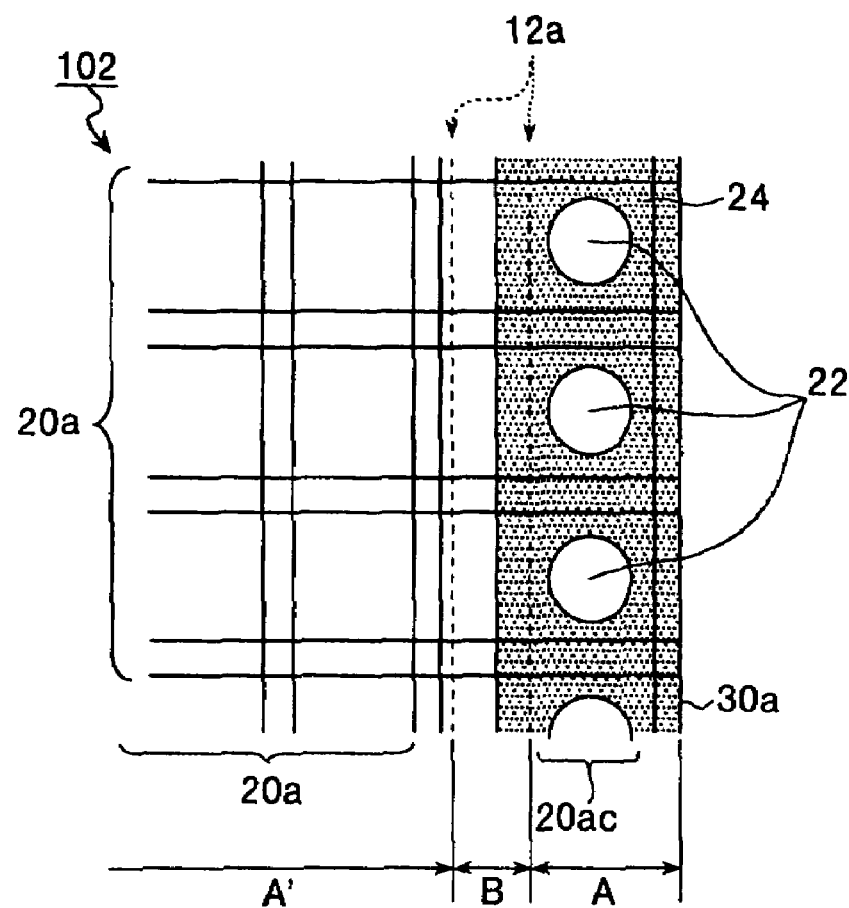
FIGS. 4 A–B are explanation drawings showing an electro-optical device according to a third embodiment.
Figure 4B:
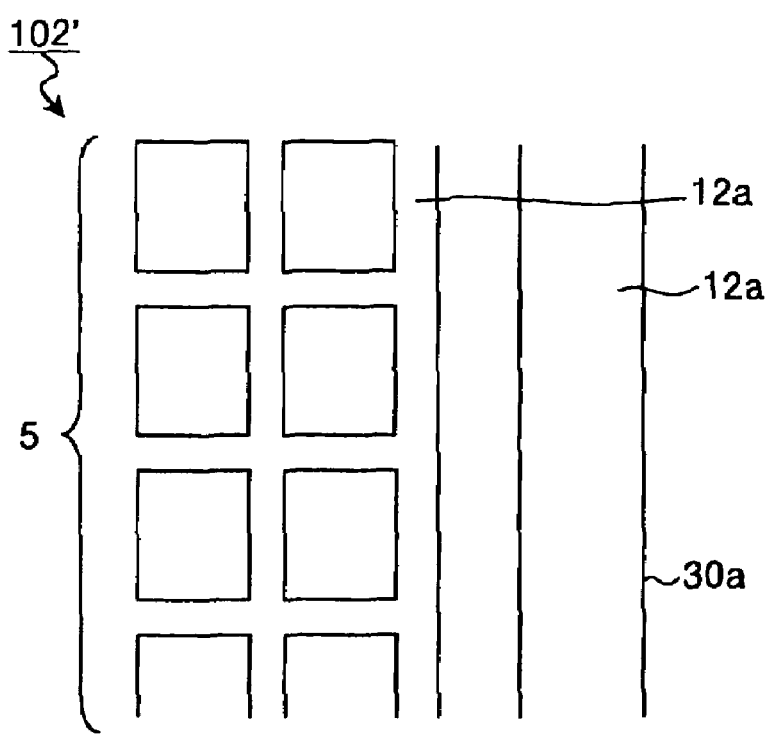

FIG. 4 is an explanation drawing showing an electro-optical device according to a third embodiment. An electro-optical device 102 according to the third embodiment is similar in structure to the electro-optical device 100 according to the first embodiment (see FIG. 1); and it is different in that a protection layer 12a is formed on a predetermined region, which extends inside from the external periphery of the first substrate 30a so as to form the first inter-substrate conduction unit 20ac thereon; the protection layer 12a is not formed inside of that, and on the region where the first drive electrode 20a is formed, the protection layer 12a is again formed. The other structures are the same as those of the electro-optical device 100 according to the first embodiment, so that like reference designates like components and the description is omitted.

As shown in FIG. 4(a),(b), the first inter-substrate conduction unit 20ac in the first drive electrode 20a is formed in the external periphery of the first substrate 30a. The protection layer 12a is formed under the first inter-substrate conduction unit 20ac, and between the region of the first drive electrode 20a on the first substrate 30a and the first inter-substrate conduction unit 20ac, the protection layer 12a does not exist. In order to shape the protection layer 12a in such a manner, in the same way as in the second embodiment, the photolithography, liquid ejection by ink-jet, or screen printing may be used.

The sealant 24 is applied so as to extend over the region A where the protection layer 12a adjacent to the substrate periphery is formed and the region B where the protection layer 10a is not formed for bonding the first and second substrates 30a and 30b together. Also, in the electro-optical device 102, the sealant 24 is applied to the first substrate 30a, so that the adhesion strength between the first substrate 30a and the sealant 24 is improved, leading to the increased resistance against the delamination of both the substrates. The conductive member 22 is arranged on the protection layer 12a, so as to correspond to the progress toward the high pixel density.

Modification

Figure 5A:
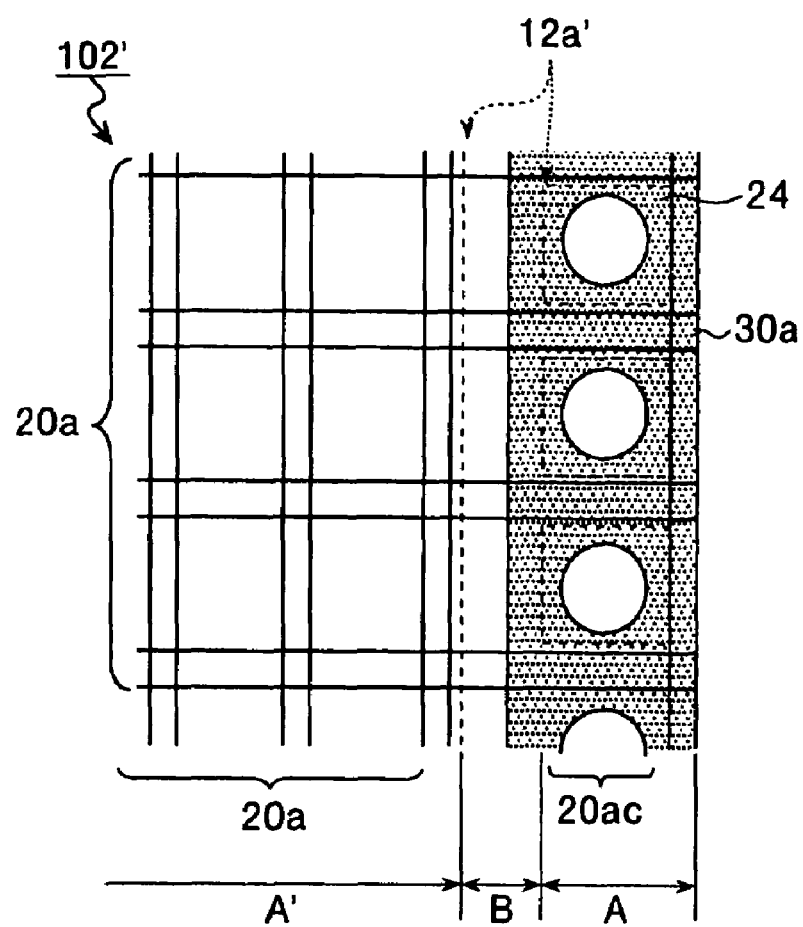
FIGS. 5 A–B are explanation drawings showing an electro-optical device according to a modified third embodiment.
Figure 5B:
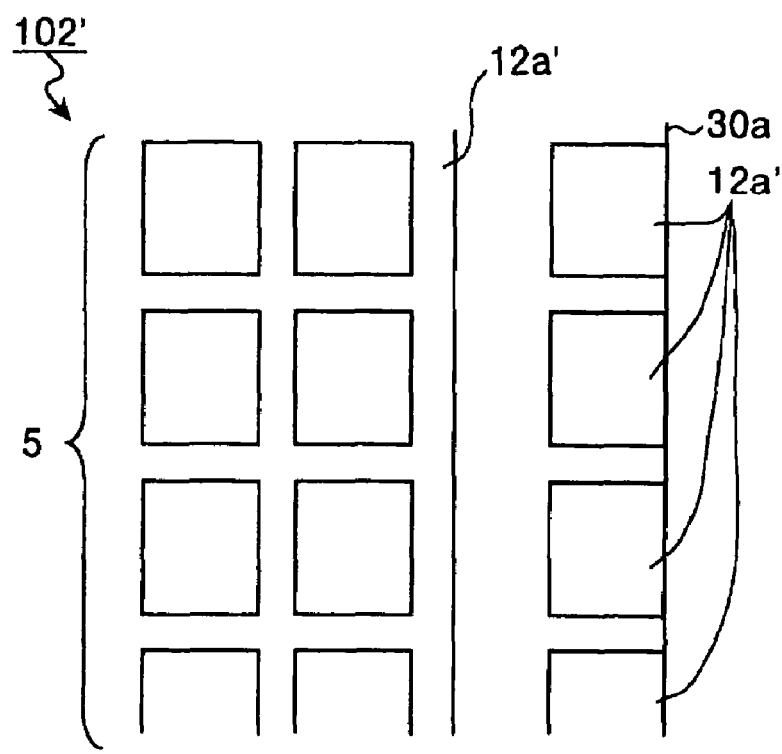

FIG. 5 is an explanation drawing showing an electro-optical device according to a modified third embodiment. As an electro-optical device 102', a protection layer 12a' may be formed in an island shape further coordinated with the first inter-substrate conduction unit 20ac. Then, the first inter-substrate conduction unit 20ac in the first drive electrode 20a is formed on the island shaped protection layer 12a'. In such a manner, the adhesion area of the sealant 24 to the first substrate 30a is increased in comparison with the electro-optical device 102 described above, increasing the adhesion strength between the sealant 24 and the first substrate 30a that much. Thereby, the resistance against delamination can be further increased in comparison with the electro-optical device 102 described above.

Fourth Embodiment

FIG. 6 is an explanation drawing showing an electro-optical device according to a fourth embodiment. An electro-optical device 103 according to the fourth embodiment is similar in structure to the electro-optical device 100 according to the first embodiment (see FIG. 1); and it is characterized in that by connecting a metallic wiring pattern 62 formed on the first substrate 30a to a first wiring pattern 60 in parallel, the electrical resistance of the wiring for routing the first drive electrode 20a to a mounting terminal is reduced. The other structures are the same as those of the electro-optical device 100 according to the first embodiment, so that like reference designates like components and the description is omitted.

Figure 6A:
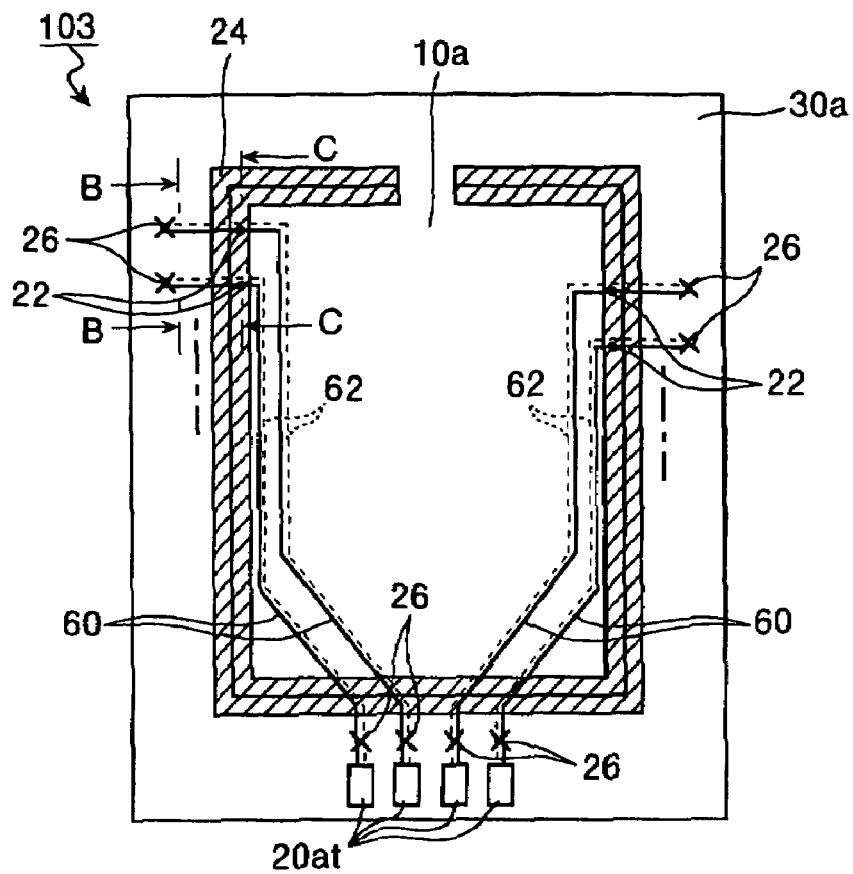
FIGS. 6 A–C are explanation drawings showing an electro-optical device according to a fourth embodiment.

As shown in FIG. 6(a), the metallic wiring pattern 62 is formed on the first substrate 30a. Also, on the metallic wiring pattern 62, the protection layer 10a is formed. The first wiring pattern 60 is formed further thereon. The first wiring pattern 60 is made of the same ITO film as of the first drive electrode 20a. In such a manner, the first wiring pattern 60 and the first drive electrode 20a can be formed in the same process, so that the manufacturing processes of the first wiring pattern 60 can be simplified.

The metallic wiring pattern 62 is made of a material with an electrical resistance lower than that of the first wiring pattern. Such a material may use any one of silver, a silver alloy, aluminum, and an aluminum alloy. By a thin film forming method such as sputtering, the above-mentioned metallic material is shaped to a metallic thin film, which is in turn formed to a predetermined wiring pattern by etching.

Figures 6B, 6C:
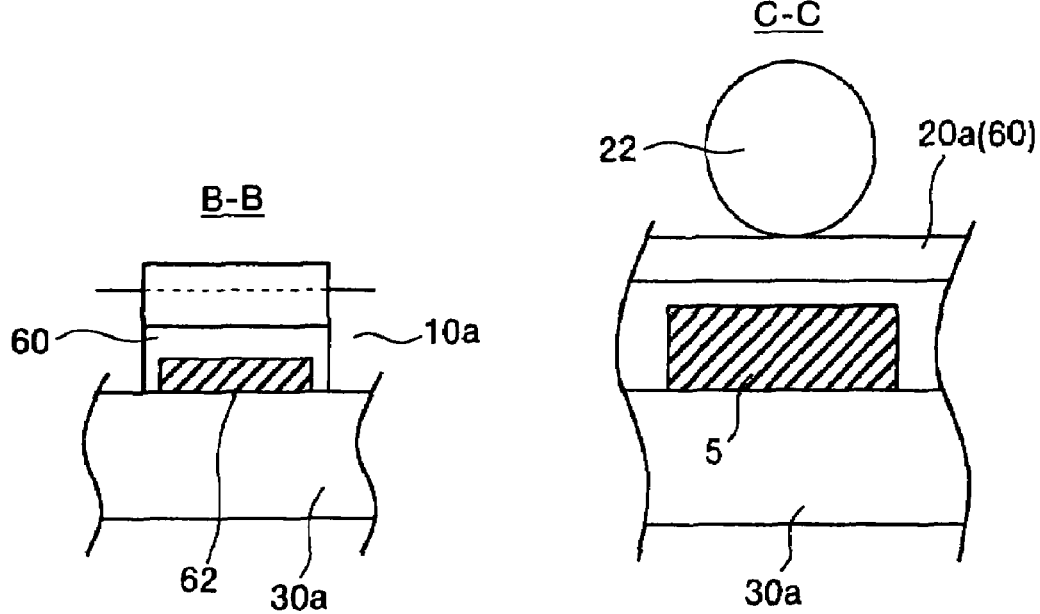

On the metallic wiring pattern 62, the color filter 5 and the protection layer 10a are formed. As shown in FIG. 6(b), since the first wiring pattern is formed to overlap the metallic wiring pattern 62, the metallic wiring pattern 62 and the first wiring pattern 60 are conducted together at conduction points 26. Thereby, the metallic wiring pattern 62 is wired with the first wiring pattern 60 in parallel, so that the combined resistance of the metallic wiring pattern 62 and the first wiring pattern 60 is smaller than the single resistance of the first drive electrode 20a. The metallic wiring pattern 62 and the first wiring pattern 60 connected in parallel together are connected to the mounting terminal 20at from which a drive signal is entered. The first inter-substrate conduction unit 20ac in the first drive electrode 20a is provided with the conductive member 22 arranged therein. The second drive electrode of the second substrate and the first drive electrode 20a of the first substrate 30a, which are arranged to oppose each other with the conductive member 22 therebetween, are conducted together (FIG. 6(a), (c)).

If a pixel is finely miniaturized in the electro-optical device, the pitch P of the first drive electrodes 20a and the line width of the first wiring pattern 60 are also reduced, so that the resistance of the first drive electrode 20a is also increased. In the electro-optical device 103, by connecting the metallic wiring pattern 62 to the first wiring pattern 60 in parallel, the electrical resistance of the wiring for routing the first drive electrode 20a to the mounting terminal is reduced. Thereby, even when the pitch P of the first drive electrodes 20a is finely reduced, a sufficiently low resistance can be ensured so as to improve the image display reliability.

Figure 7:
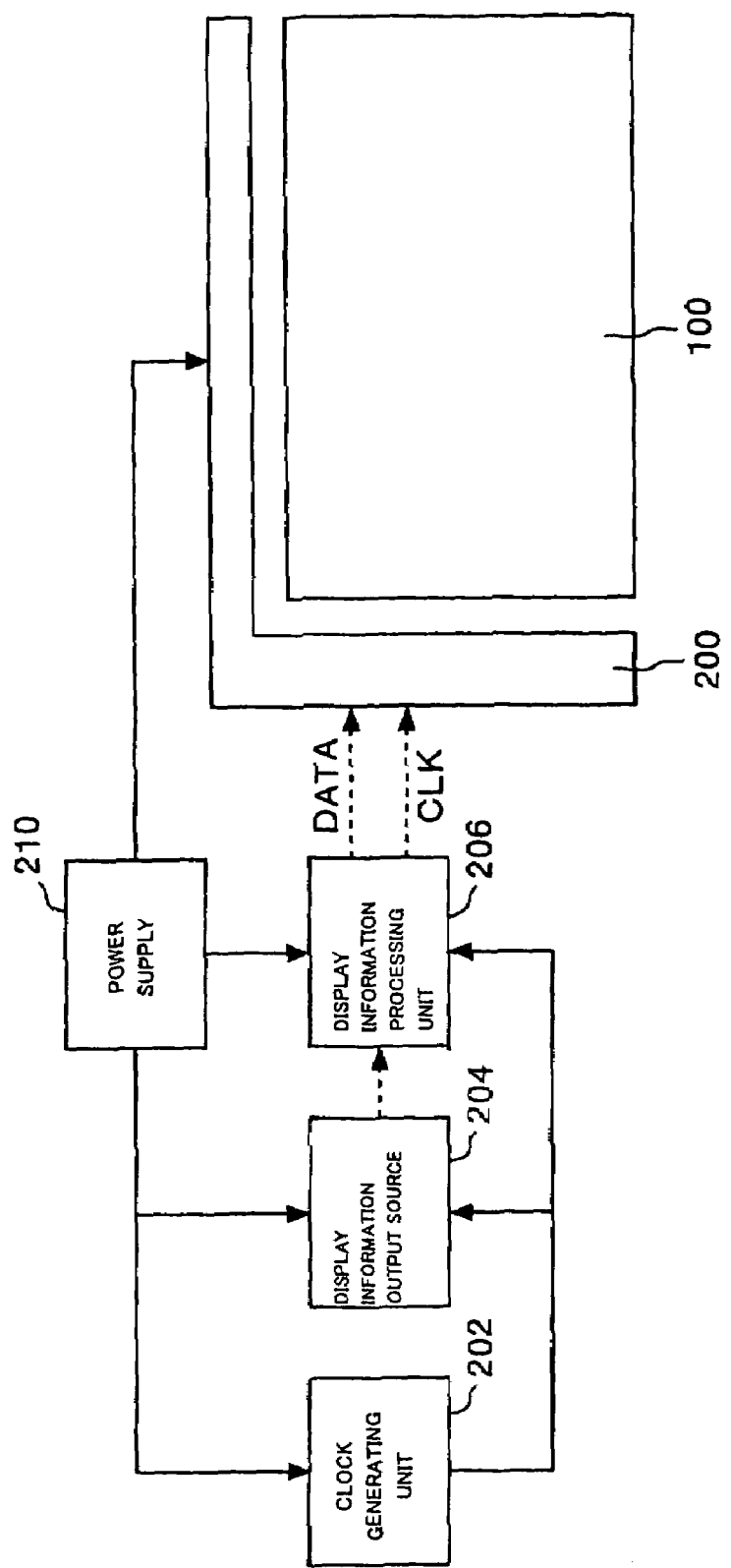
FIG. 7 is a block diagram showing a structure of an electronic instrument having the electro-optical device according to the present invention.

FIG. 7 is a block diagram of an electronic instrument having the electro-optical device according to the present invention. The electronic instrument includes a display information output source 204, a display information processing unit 206, a drive circuit 200 having a control circuit for switching a display mode, the electro-optical device 100, a clock generating unit 202, and a power supply 210. The display information output source 204 includes a memory such as a ROM (read only memory), a RAM (random access memory), and an optical disk; and a tuning circuit for synchronously producing an image signal of a television signal, so as to process an image signal with a predetermined format for producing it to the display information processing unit 206 on the basis of the clock from a clock generating unit 202. The display information processing unit 206 includes various known processing circuits such as an amplifying/polarity-reversing circuit, a phase expansion circuit, a rotation circuit, a gamma control circuit, and a clamp circuit, and it sequentially generates digital signals from display information entered on the basis of a clock signal for producing them to the drive circuit 200 along with the clock signal CLK. The drive circuit 200 drives the electro-optical device 100. The power supply 210 supplies predetermined power to the above-mentioned circuits.

OBJECTS APPLIED BY THE PRESENT INVENTION

Electronic instruments incorporating the electro-optical device according to the present invention, in addition to a mobile phone, include, among others, a portable information device called as a PDA (personal digital assistant), a portable personal computer, a personal computer, a work station, a digital still camera, an in-vehicle monitor, a digital video camera, a liquid crystal TV, a view-finder video tape recorder, a direct-view monitor video tape recorder, a car navigation device, a pager, an electronic notebook, an electronic calculator, a word processor, a TV telephone, and a POS terminal. Therefore, electrical connection structures in these electronic instruments may also of course be applied to the present invention.

Also, this electro-optical device can be an electro-optical device of at least one of transmissive and reflective type. This is the same as in an active-matrix type color electro-optical device. The electro-optical device according to the present invention can be a transmissive or reflective electro-optical panel that may have an illumination device (not shown) as a back light. A passive matrix type electro-optical device may also be incorporated.

An electro-optical panel having an active matrix type electro-optical device (a TFT (thin film transistor) and a TFD (thin film diode), for example) as a switching element may also incorporate the present invention. An active matrix type color electro-optical device may also be applied thereto. Furthermore, various electro-optical devices capable of controlling a display state of every plurality of pixels may also incorporate the present invention, which are devices such as an electroluminescence device, an inorganic electroluminescence device, a plasma display, an electrophoresis display, a field emission display, and an LED (light emitting diode) display.

In the active matrix type electro-optical device, a color filter may be provided on an element substrate having the switching element, or it may be provided on an opposing substrate opposing the element substrate. Also, the drive electrode is not limited to a stripe-shaped electrode, and it may be an electrode formed on the entire surface of the substrate. In this case, the electrode may be preferably used in the opposing substrate opposing a TFT element substrate.

What is claimed is:

1. An electro-optical device comprising:
   a first substrate;
   at least one color filter disposed on the first substrate;
   a protection layer formed on a part of the first substrate so as to overlap the at least one color filter and leave a region of the first substrate where the protection layer is not formed;
   a first inter-substrate conduction unit formed on the protection layer;
   a second substrate opposing the first substrate;
   a second inter-substrate conduction unit formed on the second substrate;
   a conductive member for electrically connecting the first and second inter-substrate units interposed between:
      the protection layer and the first inter-substrate conduction unit, and
      the second inter-substrate conduction unit; and
   a sealant that contains the conductive member bonding the first substrate and the second substrate together by extending on both the protection layer and the region of the first substrate where the protection layer is not formed.

2. A device according to claim 1, wherein the region of the first substrate where the protection layer is not formed extends inboard from an external periphery of the first substrate.

3. A device according to claim 1, wherein a shape of the protection layer disposed at a bottom of the first inter-substrate conduction unit is coordinated with a shape of the first inter-substrate conduction unit.

4. A device according to claim 1, further comprising a color filter formed on the first substrate underneath the protection layer; and
   wherein the first substrate is larger than the second substrate so that an extended region of the first substrate is produced when both the substrates are bonded together, and the extended region of the first substrate is provided with a mounting terminal to be connected to the first inter-substrate conduction unit.

5. An electro-optical device comprising:
   a first substrate;
   at least one color filter disposed on the first substrate;
   a protection layer formed on a part of the first substrate so as to overlap the at least one color filter and leave a region of the first substrate where the protection layer is not formed;
   a first electrode formed on the protection layer on the first substrate;

a first inter-substrate conduction unit formed on the protection layer and electrically connected to the first electrode;

a second substrate opposing the first substrate and having a second electrode formed thereon;

a second inter-substrate conduction unit formed on the second substrate and electrically connected to the second electrode;

a first wiring pattern formed on the first substrate and electrically connected to the first inter-substrate conduction unit;

a metallic wiring pattern formed at a lower layer of the protection layer and electrically connected to the first wiring pattern;

a conductive member for electrically connecting the first and second inter-substrate units interposed between:
the protection layer and the first inter-substrate conduction unit, and
the second inter-substrate conduction unit; and a sealant that contains the conductive member bonding the first substrate and the second substrate together by extending on both the protection layer and the region of the first substrate where the protection layer is not formed.

6. A device according to claim 5, wherein:
a material of the first wiring pattern is the same as a material of the first inter-substrate conduction unit; and
a resistance of the metallic wiring pattern is smaller than a resistance of the first wiring pattern.

7. A device according to claim 6, wherein the metallic wiring pattern comprises any one of silver, a silver alloy, aluminum, and an aluminum alloy.

8. A device according to claim 5, wherein the region of the first substrate where the protection layer is not formed extends inboard from an external periphery of the first substrate.

9. A device according to claim 5, wherein a shape of the protection layer disposed at a bottom of the first inter-substrate conduction unit is coordinated with a shape of the first inter-substrate conduction unit.

10. An electro-optical device comprising:
a first substrate;
at least one color filter disposed on the first substrate;
a protection layer formed on a part of the first substrate so as to overlap the at least one color filter and leave a region of the first substrate where the protection layer is not formed;
a first inter-substrate conduction unit formed on the protection layer;
a second substrate opposing the first substrate;
a second inter-substrate conduction unit formed on the second substrate;

a conductive member for electrically connecting the first and second inter-substrate units interposed between:
the protection layer and the first inter-substrate conduction unit, and
the second inter-substrate conduction unit; and a sealant having a first region embracing the conductive member and a second region with a thickness larger than the first region, the sealant bonding the first substrate and the second substrate together.

11. An electronic instrument comprising an electro-optical device according to claim 1.

12. An electro-optical device comprising;
a first substrate;
a protection layer formed on a part of the first substrate leaving a region of the first substrate where the protection layer is not formed, the protection layer having an outer edge defining a plurality of protrusion parts of the protection layer;
a first inter-substrate conduction unit formed on the protection layer;
a second substrate opposing the first substrate;
a second inter-substrate conduction unit formed on the second substrate;
a conductive member for electrically connecting the first and second inter-substrate units interposed between:
the protection layer and the first inter-substrate conduction unit, and
the second inter-substrate conduction unit; and
a sealant that contains the conductive member bonding the first substrate and the second substrate together by extending on both the protection layer and the region of the first substrate where the protection layer is not formed;
wherein the region of the first substrate where the protection layer is not formed includes a region between the protrusion parts, and the sealant covers the outer edge of the protection layer and the protrusion parts.

13. The electro-optical device of claim 12, further comprising at least one color filter disposed on the first substrate, and
wherein the protection layer is formed so as to overlap the at least one color filter.

14. The electro-optical device of claim 13, wherein the outer edge of the protection layer is formed in a shape of teeth of a comb.

* * * * *

UNITED STATES PATENT AND TRADEMARK OFFICE
CERTIFICATE OF CORRECTION

PATENT NO.        : 7,220,999 B2                                    Page 1 of 1
APPLICATION NO. : 10/816227
DATED             : May 22, 2007
INVENTOR(S)       : Imazeki et al.

It is certified that error appears in the above-identified patent and that said Letters Patent is hereby corrected as shown below:

Title Page, (56) References Cited:    Add           JP 2001-337334  12/2001

Column 1, Line 26:    Second occurrence of "a" should be -- an --

Column 7, Line 1:     "the" should be -- The --

Signed and Sealed this

Fifteenth Day of April, 2008

JON W. DUDAS
*Director of the United States Patent and Trademark Office*